United States Patent
Jacobs et al.

(10) Patent No.: US 9,487,419 B2
(45) Date of Patent: Nov. 8, 2016

(54) TREATMENT OF ACID MINE DRAINAGE

(71) Applicant: MINTAILS MINING S A (PTY) LIMITED, Krugersorp (ZA)

(72) Inventors: Jan Hendrik Phillipus Jacobs, Potchefstroom (ZA); Robert George Freeman, Roodepoort (ZA)

(73) Assignee: MINTAILS MINING S A (PTY) LIMITED (ZA)

( * ) Notice: Subject to any disclaimer, the term of this patent is extended or adjusted under 35 U.S.C. 154(b) by 227 days.

(21) Appl. No.: 14/385,916

(22) PCT Filed: Mar. 12, 2013

(86) PCT No.: PCT/IB2013/051943
§ 371 (c)(1),
(2) Date: Sep. 17, 2014

(87) PCT Pub. No.: WO2013/140299
PCT Pub. Date: Sep. 26, 2013

(65) Prior Publication Data
US 2015/0041404 A1 Feb. 12, 2015

(30) Foreign Application Priority Data
Mar. 20, 2012 (ZA) ................. 2012/02073

(51) Int. Cl.
| C02F 9/00 | (2006.01) |
| C02F 1/52 | (2006.01) |
| C02F 1/72 | (2006.01) |
| C02F 1/74 | (2006.01) |
| E21C 41/32 | (2006.01) |
(Continued)

(52) U.S. Cl.
CPC ............. *C02F 1/5236* (2013.01); *C02F 1/722* (2013.01); *C02F 1/727* (2013.01); *C02F 1/74* (2013.01); *C02F 9/00* (2013.01); *E21C 41/32* (2013.01); *C02F 1/283* (2013.01); *C02F 1/52* (2013.01); *C02F 1/66* (2013.01); *C02F 1/68* (2013.01); *C02F 2001/007* (2013.01); *C02F 2101/18* (2013.01); *C02F 2101/203* (2013.01); *C02F 2103/10* (2013.01); *C02F 2305/023* (2013.01)

(58) Field of Classification Search
None
See application file for complete search history.

(56) References Cited

U.S. PATENT DOCUMENTS 5,120,451 A * 6/1992 Costello .................. C02F 1/586
210/750
6,337,061 B1 1/2002 Iyatomi et al.
(Continued)

FOREIGN PATENT DOCUMENTS

| CA | 2787515 | 7/2011 |
| CN | 1113081 | 12/1995 |
(Continued)

OTHER PUBLICATIONS

Doye, et al., "col. Leaching Test to Evaluate the Beneficial Use of Alkaline Industrial Wastes to Mitigate Acid Mine Drainage," Tailings and Mine Waste 02, 2002, pp. 271-282, Swets & Zeitlinger.*
(Continued)

*Primary Examiner* — Chester Barry
(74) *Attorney, Agent, or Firm* — Sheridan Ross P.C.

(57) ABSTRACT

A method for treating acid mine drainage includes mixing acid mine drainage (20) and alkaline tailings from a gold recovery process (140). The acid mine drainage is thereby neutralized (12).

20 Claims, 7 Drawing Sheets

(51) Int. Cl.
  *C02F 1/28*    (2006.01)
  *C02F 1/66*    (2006.01)
  *C02F 1/68*    (2006.01)
  *C02F 1/00*    (2006.01)
  *C02F 101/18*  (2006.01)
  *C02F 103/10*  (2006.01)
  *C02F 101/20*  (2006.01)

(56) References Cited

U.S. PATENT DOCUMENTS

2002/0158023 A1  10/2002  Wurzburger
2003/0132166 A1  7/2003   Rey
2011/0182786 A1  7/2011   Burba

FOREIGN PATENT DOCUMENTS

| CN | 1554785 | 12/2004 |
| CN | 101343039 | 1/2009 |
| CN | 101392326 | 3/2009 |
| CN | 101736159 | 6/2010 |
| CN | 102286661 | 12/2011 |
| WO | WO 2005/100243 A1 | 10/2005 |

OTHER PUBLICATIONS

Skousen, et al., " Overview of Acid Mine Drainage Treatment with Chemicals," Center for Agriculture, Natural Resources and Community Development, West Virginia University Extension Services, http://www.wvu.edu/.about.agexten/landrec/chemtrt.htm, 15 pages. (2008).*

International Preliminary Report on Patentability for International (PCT) Application No. PCT/IB2013/051943, dated Sep. 23, 2014, 5 pages.

International Search Report prepared by the European Patent Office on Sep. 11, 2013, for International Application No. PCT/IB2013/051943.

Search Report for Chinese Patent Application No. 2013800157660, dated Jul. 28, 2015, 2 pages.

* cited by examiner

TREATMENT OF ACID MINE DRAINAGE

CROSS REFERENCE TO RELATED APPLICATIONS

This application is a national stage application under 35 U.S.C. 371 and claims the benefit of PCT Application No. PCT/IB2013/051943 having an international filing date of Mar. 12, 2013, which designated the United States, which PCT application claimed the benefit of South Africa Patent Application No. 2012/02073 filed Mar. 20, 2012, the disclosure of each of which are incorporated herein by reference.

FIELD OF THE INVENTION

This invention relates to acid mine drainage. In particular, this invention relates to a process for treating acid mine drainage.

BACKGROUND OF THE INVENTION

Vast quantities of acid mine drainage (AMD) are contained within the now abandoned underground mining voids on the Witwatersrand in South Africa and other locations. AMD arises from the contact of mineral sulphides, e.g. iron sulphide or pyrite, with water and oxygen, which chemically generates a dilute sulphuric acid. AMD is thus typified as a low pH, corrosive aqueous substance having a high content of dissolved metal salts.

Although a host of chemical processes contribute to the formation of acid mine drainage, pyrite oxidation is by far the greatest contributor. A general equation for pyrite oxidation is:

$$2FeS_2(s)+7O_2(g)+2H_2O(l) \rightarrow 2Fe^{2+}(aq)+4SO_4^{2-}(aq)+4H^+(aq) \quad (1)$$

The oxidation of sulphide to sulphate solubilises iron II (ferrous iron), which is then subsequently oxidized to iron III (ferric iron) according to the equation:

$$4Fe^{2+}(aq)+O_2(g)+4H^+(aq) \rightarrow 4Fe^{3+}(aq)+2H_2O(l) \quad (2)$$

The oxidation of sulphide to sulphate and the oxidation of ferrous iron to ferric iron can either occur chemically spontaneously or it can be catalyzed by microorganisms that derive energy from the oxidation reaction. The ferric iron produced can further oxidize additional pyrite and itself form additional ferrous iron according to the reaction:

$$FeS_2(s)+14Fe^{3+}(aq)+8H_2O(l) \rightarrow 15Fe^{2+}(aq)+2SO_4^{2-}(aq)+16H^+(aq) \quad (3)$$

The nett effect of these reactions is to increase the concentration of hydrogen ions in solution, thereby lowering the pH and maintaining the solubility of ferric iron.

Being an acidic medium, AMD is capable of dissolving and mobilizing other toxic metal salts found in tailings dumps, rock and reef dumps, and the underground cavities in which the AMD is formed, e.g. salts of copper, nickel, zinc, manganese and aluminum. It will be appreciated that AMD will thus contain a variety of dissolved metal salts which would be harmful if allowed to escape to the environment.

Water levels within underground mining basins, including those in the Witwatersrand area in South Africa, have accumulated AMD and have continued to rise over the years. Levels are now very high and AMD is overflowing in certain areas, e.g. on the West Rand in South Africa. In the large central Witwatersrand basin, AMD is widely expected to overflow from the mining cavities in approximately the next two to four years.

It is thus an aim of this invention to provide a means of alleviating these AMD problems.

SUMMARY OF THE INVENTION

According to the invention, there is provided a process for treating acid mine drainage, the method including mixing acid mine drainage and alkaline tailings from a gold recovery process, thereby to neutralize the acid mine drainage.

The acid mine drainage (AMD) may thus be as hereinbefore described, i.e. arising from contact of mineral sulphides with water and oxygen, particularly in tailings dumps, waste and reef stockpiles, and underground mining voids. The AMD typically comprises dilute sulphuric acid, and has a pH in the range 2 to 6.

The AMD that is used in the invention will thus typically be in the form of an AMD stream, e.g. an AMD stream emanating from an underground mining void.

The alkaline tailings will also typically be in the form of an alkaline tailings stream emanating from the gold recovery process.

The alkaline tailings stream may have a minimum pH of at least 9.5, preferably at least 10.5, this being the operational range in the gold recovery process for effective gold recovery.

The alkaline tailings stream may have a residual dissolved oxygen concentration emanating from the gold recovery process; the residual dissolved oxygen concentration may be at least 2 mg/l, preferably at least 10 mg/l, more preferably at least 14 mg/l.

The gold recovery process may include a carbon-in-leach (CIL) circuit or a separate leach and carbon-in-pulp (CIP) circuit and the alkaline tailings stream may thus be a CIL or CIP circuit tailings stream.

The mixing may be effected in a mixing stage, e.g. in a mixing vessel, with the AMD stream and the alkaline tailings stream being fed continuously into the mixing stage, and a neutralized AMD stream being withdrawn continuously from the mixing stage, e.g. for further processing or disposal.

The process may include agitating the mixing stage while the AMD stream and the alkaline tailings stream are fed into it and the neutralized AMD stream is withdrawn from it. Agitating the mixing stage may be by mechanical means, e.g. by means of at least one turbine blade impeller that would maintain the mixed products as a slurry. Alternatively, the mixing may be achieved by the injection of compressed air into an appropriately designed mixing vessel.

The process may include introducing an oxidising agent into the mixing stage. The oxidising agent may be selected from air, oxygen, oxygen enriched air or hydrogen peroxide. Introducing the oxidising agent into the mixing stage may also agitate the mixture of the AMD stream and the alkaline tailings stream in the mixing stage.

The process may include introducing a neutralizing agent into the mixing stage. The neutralizing agent may be an alkali, e.g. sodium hydroxide, calcium carbonate or calcium hydroxide. Preferably the neutralizing agent is calcium hydroxide (slaked lime).

The process may include destroying a cyanide content in the neutralized AMD stream. The neutralized AMD stream may thereafter be disposed.

The process may include subjecting the neutralized AMD stream to liquid/solid separation or settlement, in a separation or settlement stage, whereby a precipitate formed when neutralizing the AMD stream is co-separated or co-settled with a solids component of the alkaline tailings stream, thereby to produce a precipitate- and tailings-containing slurry and a substantially precipitate- and solids-free stream. The liquid/solid separation stage may be a gravity separator, e.g. a conical bottom thickener or a clarifier.

The precipitate and tailings slurry may have a solids content of at least 40 wt %, preferably at least 50 wt %, more preferably at least 60 wt %.

The substantially precipitate-free stream may have a solids content of about 50 mg/l, preferably about 20 mg/l, more preferably about 10 mg/l and a pH of at least 8.5, preferably at least 8.0, more preferably at least 7.5.

The precipitate and tailings slurry may be disposed of to a tailings disposal facility or slimes dam.

The substantially precipitate-free stream may be disposed of, e.g. to the environment or to a tailings disposal facility or slimes dam, or it may be reused in the gold recovery process or it may be directed to a water treatment operation for further upgrading to qualities acceptable for domestic or agricultural water use. Preferably the precipitate-free stream is reused in the gold recovery process or for further upgrading for domestic or agricultural re-use.

The South African Government, led by the Department of Water Affairs (DWA), is instituting emergency measures to neutralize AMD produced in underground mining voids in South Africa. In the medium term it is envisaged that neutralized AMD, although saline, could be used in industry. In the short term, however, neutralized AMD is likely simply to be discharged to the environment. In the long term, the DWA plans to extend the AMD treatment process to generate potable water for domestic and/or agricultural use.

The conventional process for neutralizing AMD involves adding calcium carbonate and calcium hydroxide (slaked lime) or calcium hydroxide only into AMD and agitating the mixture in the presence of air or oxygen, thereby to precipitate the harmful dissolved metal salts as insoluble metal hydroxides or carbonates, e.g. $Fe_2(CO_3)_3$. The precipitate is collected as a slurry or sludge and typically deposited onto existing gold plant tailings disposal facilities or slime dams. The AMD neutralization process is costly, mostly due to the large volumes involved, the mass of the neutralizing chemicals required and the energy cost of supplying large volumes of air. Furthermore, a relatively high percentage of the water in the treated AMD is unavailable for re-use after treatment as it is associated with the precipitate slurry and discarded therewith.

There are a large number of gold recovery process plants operating on the Witwatersrand. In carbon-in-leach (CIL) and carbon-in-pulp (CIP) gold recovery processes, cyanide is used to leach gold from a gold-bearing slurry into solution, whereafter a gold-cyanide complex is adsorbed onto activated carbon. In order for the gold effectively to be leached into solution by the cyanide, it is necessary to increase the pH of the gold bearing slurry to approximately 10.5, e.g. with lime or sodium hydroxide, and to introduce air or oxygen into the system thereby to oxidise the reactive iron and cyanide species which enable the leaching of gold into solution as well enable as the adsorption of the gold-cyanide complex onto the activated carbon.

Gold is recovered from the loaded activated carbon by subjecting the loaded activated to an elution process wherein the gold-cyanide complex is desorbed from the activated carbon by means of a sodium hydroxide solution. The gold-bearing solution or eluate then reports to an electrowinning circuit where gold is recovered onto electrowinning cathodes, stripped from the cathodes, calcined and smelted to produce gold bullion.

The gold-depleted slurry or tailings of the gold recovery process is routed to a residue or tailings section from where it is pumped to a tailings disposal facility or slimes dam. The CIL tailings have a high pH and a comparatively high dissolved oxygen content owing to the process by which gold is extracted from the gold-bearing slurry.

BRIEF DESCRIPTION OF FIGURES

The invention will now be described, by way example, with reference to the accompanying diagrammatic drawings and graphs.

In the drawings.

DETAILED DESCRIPTION OF THE INVENTION

Figure 1:
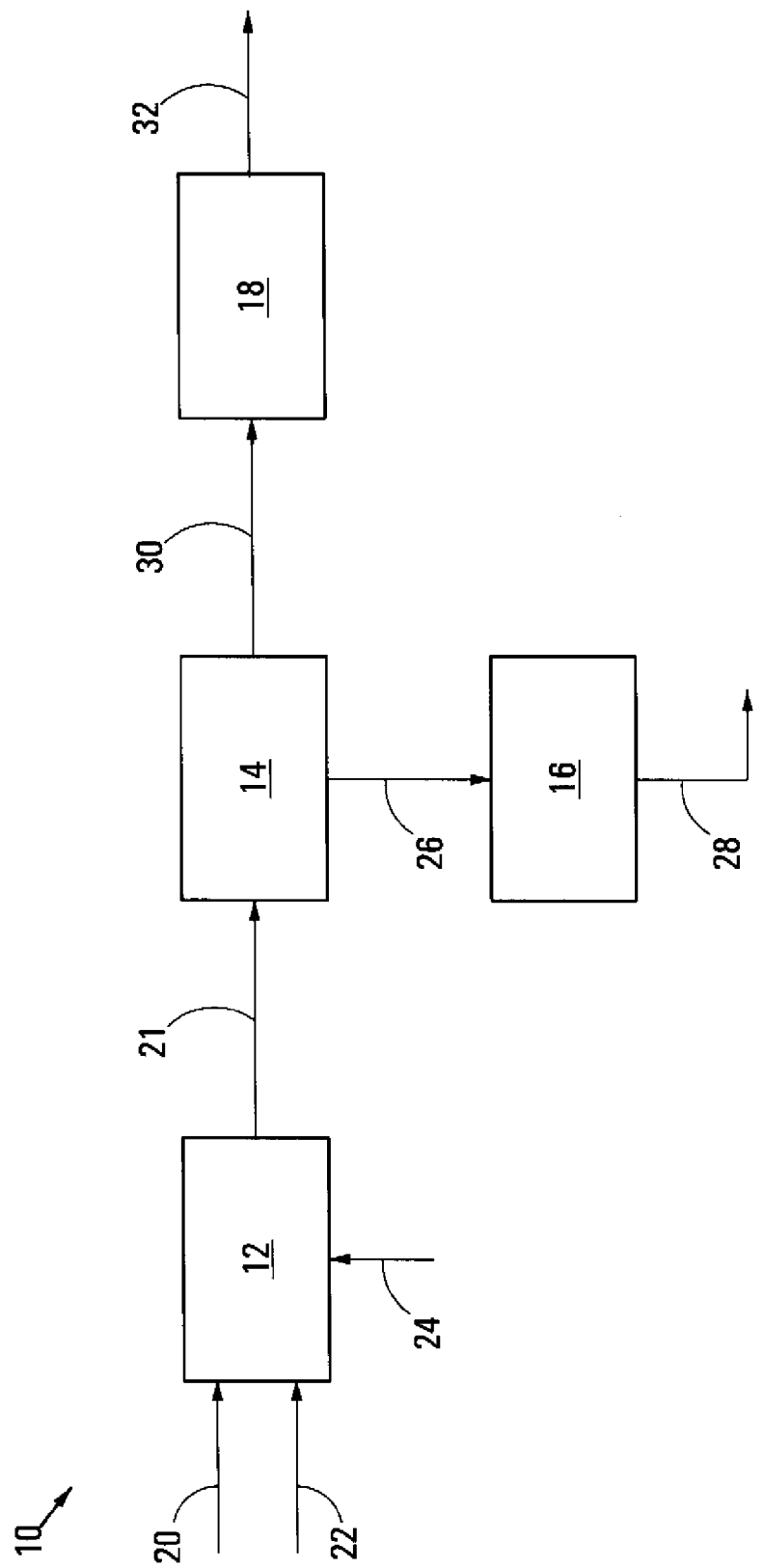
FIG. 1 is a diagram of a conventional AMD neutralization process.

Referring to FIG. 1 of the drawings, reference numeral 10 generally indicates a conventional AMD neutralization process. The process 10 comprises an aeration tank or mixing tank 12, one or more thickeners or clarifiers 14, a sludge collector 16 and a neutralized AMD water tank 18.

An AMD stream 20 having a pH of between 2 and 6 is fed into the aeration tank 12 along with calcium carbonate and slaked lime (calcium hydroxide) or slaked lime only 22 as a neutralizing agent and air or oxygen 24 as an oxidising agent. The lime 22 functions to neutralize the AMD stream 20 by raising the pH to between 7 and 8, while the air or oxygen 24 serves to oxidise the dissolved metal species thereby to enable subsequent precipitation reactions to take place.

At the pH of between 7 and 8, the metal cations in the AMD stream 20 react with the carbonate and/or hydroxide anions resulting from the dissolution of the lime 22 added to the AMD stream 20, and precipitate out of solution as insoluble metal carbonates and/or hydroxides. The suspension of neutralized AMD 21 and insoluble metal carbonates and/or hydroxides produced in the aeration tank 12 is fed into one or more clarifiers 14. The clarifiers 14 are typically conical bottom liquid/solid gravity separation vessels or thickeners.

Typically a number of clarifiers 14 are installed in parallel in order to provide sufficient residence time in each clarifier 14 for the insoluble metal carbonates and/or hydroxides to settle out of the neutralized AMD stream 21. It will be appreciated that any number of clarifiers 14 may be arranged in parallel or series, depending on the volume of AMD 20 required to be treated. As the precipitate settles in the clarifiers 14, a thickened precipitate slurry of insoluble metal carbonates and/or hydroxides is produced and is removed from the bottom of the clarifiers 14 along flow line 26 to a sludge collector 16. From the sludge collector 16, the slurry is pumped to a tailings disposal facility or slimes dam (not shown) along flow line 28. The substantially metal-free and precipitate-free supernatant liquid or overflow from the clarifiers 14 flows along flow line 30 to the neutralized AMD water tank 18. The overflow is disposed of along flow line 32, e.g. to the environment or is reused or is subjected to further downstream processing.

Figure 2:
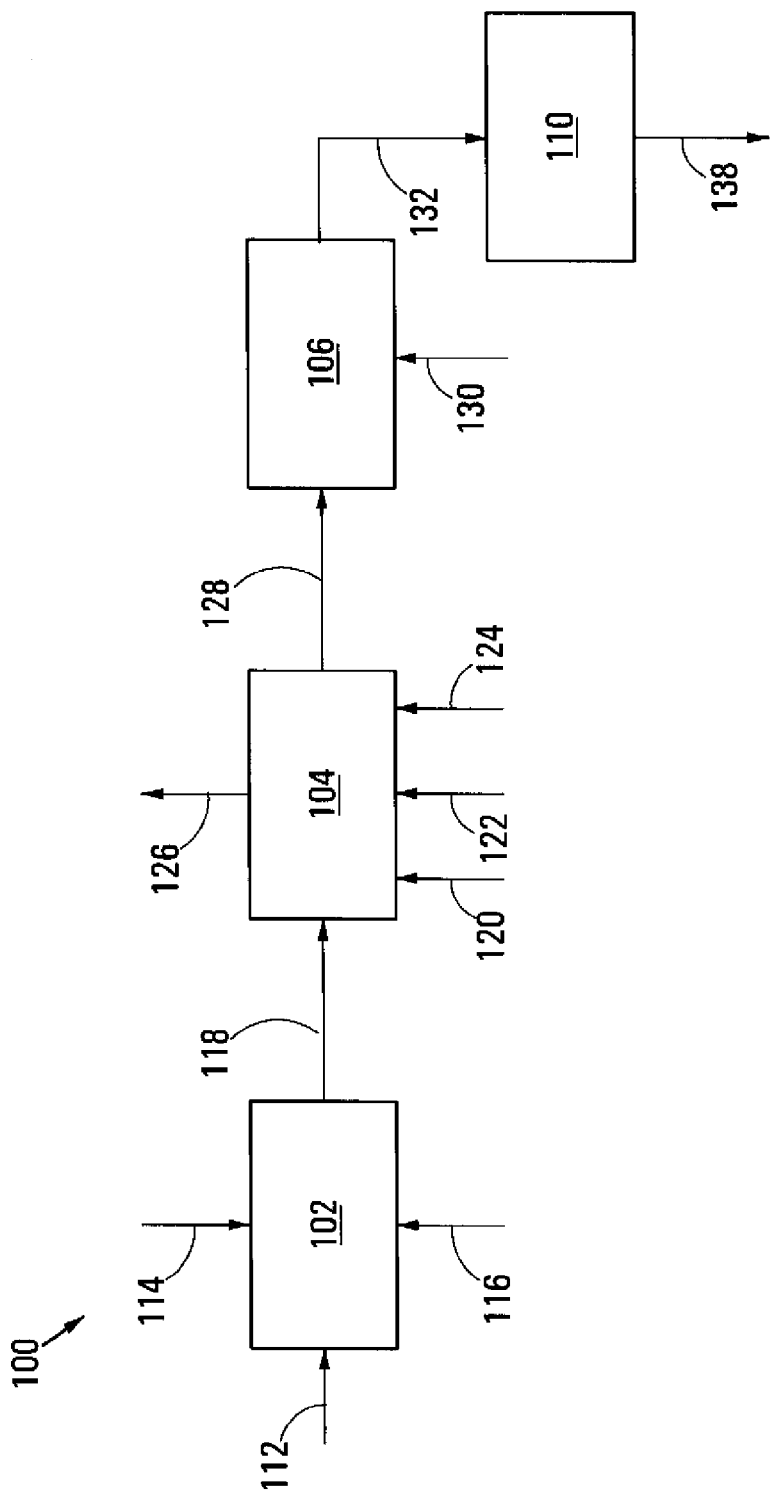
FIG. 2 is a diagram of a CIL circuit of a conventional carbon-in-leach gold recovery process.

Referring to FIG. 2 of the drawings, reference numeral 100 generally indicates a carbon-in-leach section of a conventional carbon-in-leach (CIL) gold recovery process. The section 100 comprises a preconditioning stage 102, a carbon-in-leach circuit 104, a cyanide destruction stage 106 and a tailings tank 110.

Gold bearing slurry 112 from a slurry preparation facility (not shown) is fed to the preconditioning stage 102. Typically two mechanically agitated preconditioning tanks (not shown) are provided in the preconditioning stage 102 and lime 114 is added to the first of those two tanks to raise the pH of the gold bearing slurry to a pH of approximately 10.5, being the optimal pH for gold dissolution. Oxygen 116 is added to both the preconditioning tanks in the preconditioning stage 102 by injecting oxygen 116 into the tanks or the slurry streams, thereby to oxidise the reactive sulphide species in the slurry 112. Pre-oxidation is an important step in reducing cyanide consumption and increasing gold recovery. Pre-oxidation oxidizes the reactive iron sulphide species to ferric hydroxide species which are stable in cyanide solutions, according to the following set of chemical equations:

$$2FeS + O_2 + 2H_2O \leftrightarrow 2Fe^{2+} + 2S + 4OH^- \quad (4)$$

$$4Fe^{2+} + O_2 + 2H_2O \leftrightarrow 4Fe^{3+} + 4OH^- \quad (5)$$

$$Fe^{3+} + 3OH^- \leftrightarrow Fe(OH)_3 \quad (6)$$

Pre-oxidation also transforms the sulphur species into sulphate species:

$$2S^{2-} + 2O_2 + H_2O \leftrightarrow S_2O_3^{2-} + 2OH^- \quad (7)$$

$$S_2O_3^{2-} + 2OH^- + 2O_2 \leftrightarrow 2SO_4^{2-} + H_2O \quad (8)$$

$$S^{2-} \rightarrow S_2^{2-} \rightarrow S^0 \rightarrow S_2O_3^{2-} \rightarrow SO_3^{2-} \rightarrow SO_4^{2-} \quad (9)$$

The pre-oxidised slurry is fed along flow line 118 to the CIL circuit 104. The CIL circuit consists of five or more mechanically agitated tanks (not shown). Cyanide 120, activated granular carbon 122 and air or oxygen 124 are introduced into the CIL tanks to facilitate the leaching of gold from the gold-bearing slurry 112 into solution, and also to facilitate the subsequent adsorption of the dissolved gold onto the activated carbon 122. Gold is leached into solution according to the following chemical reaction:

$$4Au + 8NaCN + O_2 + 2H_2O \rightarrow 4Na[Au(CN)_2] + 4NaOH \quad (10)$$

The CIL tanks are operated such that the gold-bearing slurry 118 passes under force of gravity or by pumping successively from the first tank in the circuit to the last tank in the circuit, whereas the activated carbon is retained within each individual tank by inter-stage screens (not shown). As the slurry passes through the CIL circuit 104, gold is progressively leached from the slurry and adsorbed onto the activated carbon.

The activated carbon within the CIL circuit is carefully managed. As the gold loading on the activated carbon increases, the activated carbon is pumped upstream within the CIL circuit 104, i.e. counter-current to the downward flow of gold-bearing slurry. Loaded activated carbon is batch pumped from the first tank of the CIL circuit 104 along flow line 126 to an elution circuit (not shown). In the elution circuit, a sodium hydroxide solution is used to desorb or elute the gold from the activated carbon. Elution takes place in an elution column at elevated temperature and pressure, thereby completely stripping the activated carbon of adsorbed gold. The stripped carbon is chemically and thermally regenerated in a separate process (not shown) and returned to the CIL circuit 104 as activated carbon 122. The gold bearing solution or eluate from the elution column is sent to an electrowinning circuit (not shown). In the electrowinning circuit, gold is recovered onto electrowinning cathodes, then subsequently stripped from the cathodes, calcined and smelted to produce gold bullion.

The now barren slurry exiting the CIL circuit 104 passes along flow line 128 to the cyanide destruction stage 106. The cyanide destruction stage 106 comprises a tank into which the barren slurry flows and into which a cyanide destruction product 130 is introduced, thereby to reduce the cyanide concentration of the barren slurry. Typical examples of cyanide destruction products 130 are sodium metabisulphite, hydrogen peroxide, or ferrous sulphate. The cyanide-reduced barren slurry flows along flow line 132 to the tailings tank 110, from where it is pumped along flow line 138 to a tailings disposal facility (not shown). The cyanide-reduced barren slurry has a high pH, e.g. between 9.5 and 10.5, and a dissolved oxygen concentration of, e.g. between 2 mg/l and 10 mg/l, owing to the use of lime 114 and the introduction of air 124 in the CIL circuit 104 of the process 100.

Figure 3:
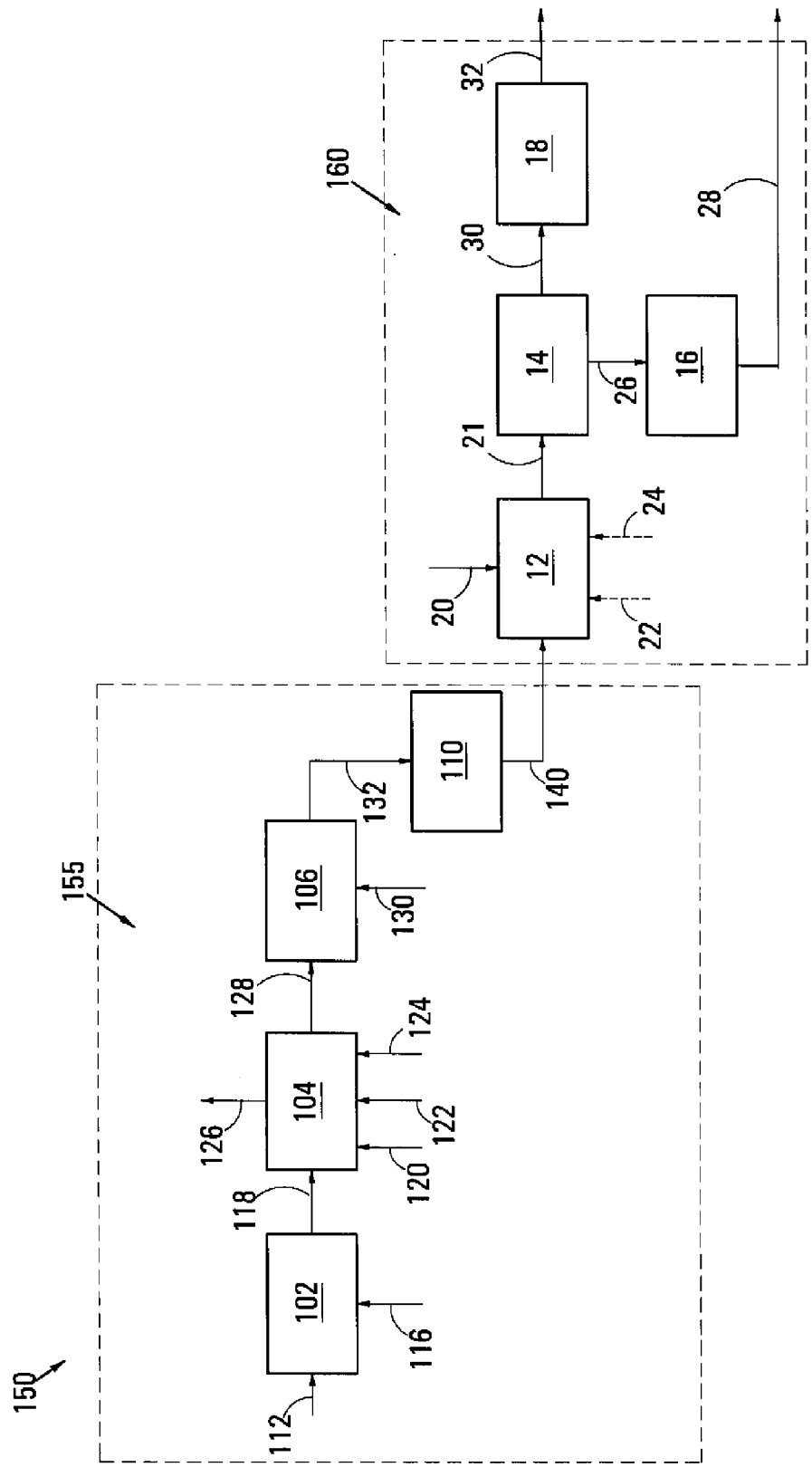
FIG. 3 is a diagram of an AMD treatment process in accordance with a first embodiment of the invention.

Referring to FIG. 3 of the drawings, reference numeral 150 generally refers to a process for the treatment of AMD according to a first embodiment of the invention. The process 150 is in some respects similar to the process 10 and the process 100, and unless otherwise indicated the same reference numerals used in FIGS. 1 and 2 are used in FIG. 3 to indicate the same or similar features.

The process 150 is divided into two main sections: a carbon-in-leach gold recovery section 155 and an AMD treatment section 160. The gold recovery section 155 of the process 150 comprises a preconditioning stage 102, a carbon-in-leach circuit 104, a cyanide destruction stage 106 and a tailings tank 110, as hereinbefore described with reference to FIG. 2.

The section 155 is operated as hereinbefore described with reference to the process 100 (FIG. 2). The cyanide-reduced barren slurry from the cyanide destruction stage 106 flows along the flow line 132 to the tailings tank 110, from where it is introduced to the acid mine drainage treatment section 160 along a flow line 140. The cyanide-reduced barren slurry has a pH of approximately 10.5 and a dissolved oxygen content of approximately 5 mg/l.

The AMD treatment section 160 of the process 150 comprises an aeration or mixing tank 12, one or more thickeners 14, a thickened slurry collector 16 and a neutralized AMD water tank 18, as hereinbefore described with reference to FIG. 1. The clarifiers 14 of the process 10 are not suitable for the heavy duty liquid/solid separation of gold recovery process tailings, and thus the clarifiers 14 in the process 150 are converted to, or replaced by, more robust slurry thickeners 14.

The tailings stream 140 from the section 155, initially at a pH of approximately 10.5, is added along with AMD water 20 at a pH of about 2 to 6, to the mixing tank 12. By mixing the streams 140 and 20, the AMD stream 20 is neutralized by the tailings stream 140 to a pH of approximately 7.5. By mixing the tailings stream 140 and the AMD stream 20, the residual cyanide in the tailings stream 140 is also reduced.

The stream 140 has an inherently sufficiently high pH and a corresponding dissolved oxygen content to neutralize and to oxidise the AMD stream 20 thereby to precipitate out the harmful metallic salts in the AMD stream 20 as insoluble metal carbonates and/or hydroxides, without the need for additional lime or oxygen (as is required in the case of the process 10 hereinbefore described). It will however be appreciated that should additional lime 22 and/or air or oxygen 24 be required to neutralize and/or oxidise the AMD stream 20 in order to aid in the precipitation of the metal species therefrom, the mass or volume of the lime 22 and/or air or oxygen 24 will be greatly reduced owing to the favourable chemical properties of the tailings stream 140 derived from the section 155.

The mixture of gold recovery process tailings 140, neutralized AMD and insoluble metal carbonates and/or hydroxides produced in the mixing tank 12 is fed into one or more thickeners 14 along flow line 21. The thickeners 14 are conical bottom gravity separation vessels suitable for settling solids from a gold recovery process slurry. Typically the thickeners 14 are installed in parallel in order to provide sufficient residence time for the insoluble metal carbonates and/or hydroxides to settle out of the neutralized AMD stream 21. It will be appreciated that any number of thickeners 14 may be arranged in parallel, depending on the volume of AMD 20 required to be treated. As the solids settle in the thickeners 14, a thickened precipitate slurry of barren gold recovery process tailings and insoluble metal carbonates and/or hydroxides is produced and is removed from the bottom of the thickeners 14 along flow line 26 to a thickened slurry collector 16. From the thickened slurry collector 16, the slurry is pumped to a tailings disposal facility or slimes dam (not shown) along flow line 28. The substantially metal-free and solids-free supernatant liquid or overflow from the thickeners 14 flows along flow line 30 to the neutralized AMD water tank 18. As the overflow is suitable for general industrial use, e.g. for use in a metallurgical process such as the section 155, the overflow is recycled as utility water along the flow line 32. It may be feasible to discharge the overflow to the environment provided that water effluent quality regulations are complied with, e.g. if the residual cyanide content therein is sufficiently low for safe disposal.

In another embodiment of the invention (not shown), air or oxygen 24 and/or a cyanide destroying product 130 may be added to the mixing tank 12 of the section 160, thereby to destroy the residual cyanide in the neutralized AMD stream. It is to be appreciated that the low pH of the AMD stream and its ferrous sulphate would have already significantly reduced the cyanide content of the stream as both the lower pH and ferrous sulphate content of the AMD stream serve as effective methods for cyanide destruction. The implication here is that the need for upstream cyanide destruction products 130 to vessel 106 or to stage 160 are significantly reduced by the effective cyanide destruction capability of the AMD.

The Inventors believe that integrating the processes 10 and 100 to create the process 150, as illustrated, has the following synergies and will yield the following surprising benefits over the conventional AMD treatment processes of the art:

1. Reagent cost, particularly lime cost, associated with neutralizing AMD will be drastically reduced or avoided by virtue of the properties of the tailings stream which renders it suitable to be used as a neutralizing agent in the treatment of AMD;
2. The mass or volume of oxygen/air required to be injected to promote the oxidation of metal species in the AMD will be drastically reduced or avoided by virtue of the properties of the tailings stream which render it suitable to be used as an oxidizing agent in the treatment of AMD;
3. Intimate mixing can be achieved between the tailings stream and acid mine drainage stream, leading to improved pH control of the neutralized AMD stream, with a consequential reduction in pipeline scale formation;
4. Precipitating the metal carbonate and/or hydroxide precipitate from the AMD stream with the solids from the gold recovery process tailings stream, results in one slurry stream being generated for disposal, thereby avoiding duplicate process steps and maximizing the availability of neutralized water;
5. Mixing of AMD with the gold plant tailings stream will contribute to the destruction of residual cyanide, thereby either mitigating the need for or reducing the reagent requirement of a separate cyanide destruction stage in the gold recovery process, with associated cost benefits;
6. The additional of air/oxygen to the neutralized AMD would virtually destroy all residual cyanide to levels which would permit the discharge of the neutralized AMD stream directly to the environment or other disposal facility without the need to further downstream processing.

EXAMPLE

Introduction

Figure 4:
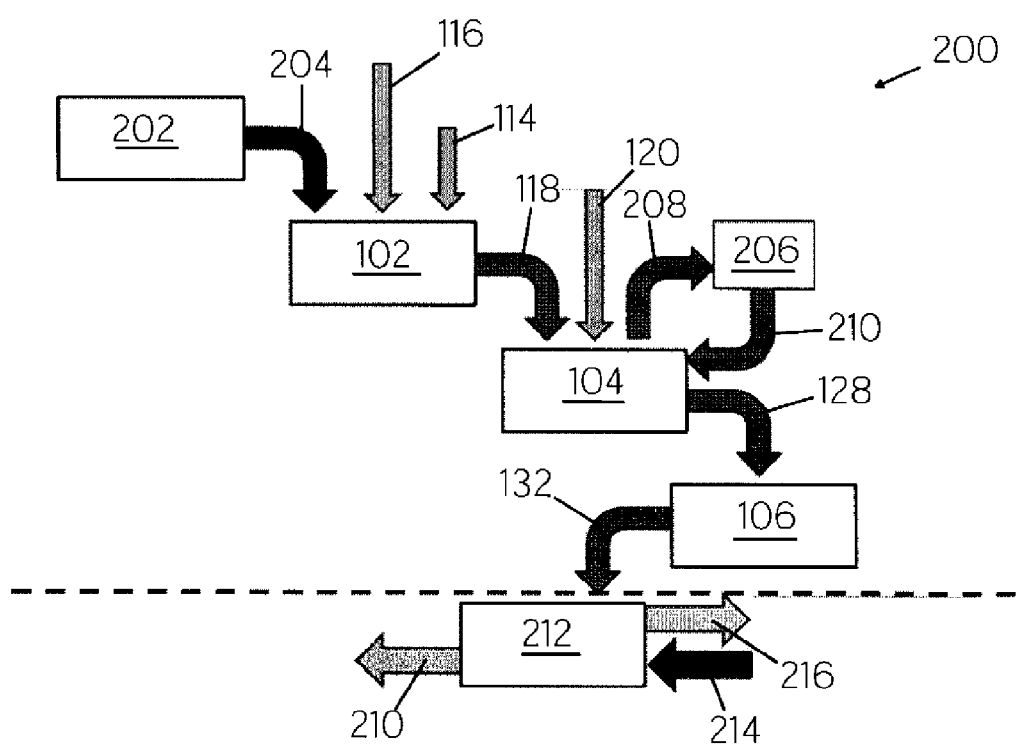
FIG. 4 is a diagram of an AMD treatment process in accordance with a second embodiment of the invention, being that of the Example, for neutralizing AMD using Mogale Gold Plant tailings.

The neutralisation of acid mine drainage (AMD) water by mixing with Mogale Gold 1 plant tailings slurry (also known as residues), in accordance with the invention, was investigated in a pilot plant trial. The pilot plant trial was carried out in a process 200 (see FIG. 4) for the treatment of AMD, according to a second embodiment of the invention.

Parts of the 200 which are the same or similar to those of the process 150 of FIG. 3, are indicated with the same reference numerals.

The process 200 includes a milling stage or plant 202, with a milled ore transfer line 204 leading from the stage 202 to the preconditioning stage 102.

The process 200 thus includes the preconditioning stage 102, and also includes the CIL circuit or cascade 104.

The process 200 further includes an elution circuit 206, with a loaded activated carbon line 208 leading from the CIL cascade 104 to the elution circuit 206, and a regenerated activated carbon line 210 leading from the elution circuit 206 to the CIL cascade 104.

The process 200 also includes the cyanide destruction stage 106, and an AMD neutralization stage 212, with the flow line 132 from the cyanide destruction stage leading directly to the AMD neutralization stage 212.

A raw AMD feed line 214 leads into the stage 212, while a neutralized water withdrawal line 216 leads from the stage 212. A barren slurry withdrawal line 218 leads from the stage 212.

A 560 m$^3$ redundant tank, conveniently located adjacent to the Mogale Water Treatment plant, was converted to serve as a mix tank for the blending of Mogale Gold 1 tailings with incoming AMD water. The mix tank thus forms part of the AMD neutralization stage 212.

The Mogale Gold 1 residue line 132 was engineered to divert tailings feed, when required, to the mix tank. A pipeline 214 containing AMD extracted from the southern compartment of the West Wits Pit was modified to supply AMD to the mix tank when needed.

The mix tank was equipped with an agitator (not shown) to affect the blend of tailings and AMD. The tank or vessel was fitted with a pump (not shown) to deliver the mixed slurry to a modified Mogale Water Plant No 3 clarifier (not shown) to serve as a slurry thickener and to effect the required liquid/solid separation.

The No 3 clarifier was modified to serve as a thickener to accept the slurry and provide a means of liquid solid separation. The drive of the clarifier was upgraded to maximum capability to affect the raking of settled solids to the underflow discharge port. The supernatant overflowed and joined the downstream process water system of the Mogale Gold 1 operation.

The existing Water Treatment Plant No 3 clarifier was thus modified for the purpose of the trial. Portions of Mogale Gold 1 tailings were diverted to a mix tank and blended with incoming South Pit AMD water before directing the mixed stream to the modified No 3 clarifier, now serving as a slurry thickener, for liquid solid separation.

The trial was run over the period 21 Aug. 2012 to 4 Sep. 2012. Mechanical failures periodically interrupted the trial.

Procedure

During the trial, certain parameters were measured to assist with assessing the overall effectiveness of the neutralisation of AMD with tailings. These are described in Table 1 below:

TABLE 1

AMD Neutralisation with Tailings: Sampling Points

| SAMPLING POINT | PARAMETERS MEASURED | | | | | |
|---|---|---|---|---|---|---|
| | Relative Density | pH | Free Cyanide ppm | WAD Cyanide ppm | Gold ppm | Iron ppm |
| CIL No. 5 Tank Overflow | ✓ | ✓ | ✓ | — | — | — |
| Tailings Transfer Tank | ✓ | ✓ | ✓ | — | ✓ | — |
| Launder Feeding Thickener | ✓ | ✓ | — | — | — | — |
| Thickener Underflow port | ✓ | — | — | — | — | — |
| Thickener Overflow Launder | — | ✓ | ✓ | ✓ | ✓ | ✓ |

Further explanation of the Table 1 sampling points is as follows:

Carbon-In-Leach (CIL 5) Tank Overflow: CIL 5 represents the final stage of the Mogale Gold 1 plant leach circuit prior to discharge to the residue (tailings) disposal section.

Tailings Transfer Tank: This sample was extracted from the residue transfer pump suction valve. This sampling point is therefore after the pulp has been contacted with 17 Winze AMD water used to detoxify cyanide in the slurry.

Launder feeding Thickener (i.e. the modified No 3 clarifier): This sampling point is after the AMD mix tank at the water treatment plant and is therefore after AMD has been introduced from the West Wits Pit.

Thickener Underflow port: Taken from the valve transferring underflow solids into the chamber underneath the thickener.

Thickener Overflow: Taken from the thickener (i.e. modified No 3 clarifier) overflow launder transferring process water to the process water circuit of the Mogale Gold 1 operation.

Results and Discussion

Tables 2 and 3 record all relevant information pertaining to the pilot trial of blending AMD with Mogale Gold 1 plant tailings.

TABLE 2

Summary of all the parameters measured, monitored and analysed during the trial.

| | CIL 5 | | | Residue | | | Feed-to Clarifier | | Underflow | Overflow Plant Free CN⁻ | DD Science Analysis Free CN⁻ | | | |
|---|---|---|---|---|---|---|---|---|---|---|---|---|---|---|
| Date | RD | pH | Free CN⁻ | RD | pH | Free CN⁻ | RD | pH | U/F RD | pH | ppm | ppm | WAD CN⁻ | Fe ppm | Au ppm |
| 21-Aug | 1.410 | 11.1 | 194 | 1.340 | 10.0 | 33 | 1.160 | 7.0 | 1.380 | 7.0 | 4.0 | | | | |
| 22-Aug | 1.390 | 10.6 | 238 | 1.310 | 9.5 | 23 | 1.170 | 8.3 | 1.420 | 8.7 | 4.0 | 1.0 | 4.6 | 1.9 | 0.013 |
| 23-Aug | 1.406 | 10.3 | 177 | 1.340 | 8.5 | 17 | 1.250 | 7.0 | 1.640 | 7.9 | 6.0 | | | | |
| 24-Aug | 1.380 | 10.1 | 225 | 1.310 | 9.5 | 33 | 1.130 | 8.6 | 1.420 | 9.0 | 4.0 | <0.5 | 4.3 | 4 | 0.011 |
| 30-Aug | 1.400 | 10.0 | 207 | 1.330 | 9.6 | 30 | 1.180 | 7.1 | 1.370 | 7.6 | 4.5 | | | | |
| 31-Aug | 1.415 | 10.0 | 227 | 1.280 | 8.7 | 15 | 1.120 | 7.9 | 1.360 | 7.6 | 4.0 | | | | |
| 1-Sep | 1.410 | 10.3 | 221 | 1.280 | 9.1 | 16 | 1.070 | 7.9 | 1.300 | 8.0 | 5.0 | | | | |
| 4-Sep | 1.400 | 10.1 | 212 | 1.300 | 9.6 | 21 | 1.108 | 7.3 | 1.300 | 6.8 | 5.0 | | | | |
| Avg | 1.401 | 10.3 | 213 | 1.311 | 9.3 | 24 | 1.150 | 7.6 | 1.400 | 7.8 | 4.6 | 1.0 | 4.5 | 3.0 | 0.012 |

TABLE 3

Tailings and AMD flow rates based on total tonnage and ratios achieved

| | CIL No. 5 | | Tailings/Residue | | 17 Winze AMD | AMD Mix Tank Feed | | Feed to clarifier | | South Pit | | |
|---|---|---|---|---|---|---|---|---|---|---|---|---|
| | Tons | | $V_{slurry}$ | | $V_{slurry}$ | $V_{AMD}$ | | $V_{slurry}$ | | $V_{slurry}$ | $V_{AMD}$ | AMD |
| Date | t/day | RD | m³/day | RD | m³/day | m³/day | RD | m³/day | RD | m³/day | m³/day | $V_{AMD\ Total}$ | Ratio |
| 21-Aug | 3410 | 1.410 | 5237 | 1.340 | 6315 | 1078 | 1.340 | 6315 | 1.160 | 13419 | 7104 | 8182 | 1.6 |
| 22-Aug | 3360 | 1.387 | 5467 | 1.310 | 6824 | 1358 | 1.310 | 6824 | 1.170 | 12444 | 5620 | 6978 | 1.3 |
| 23-Aug | 2340 | 1.406 | 3629 | 1.340 | 4333 | 704 | 1.340 | 4333 | 1.250 | 5893 | 1560 | 2264 | 0.6 |
| 24-Aug | 1620 | 1.361 | 2677 | 1.300 | 3400 | 723 | 1.300 | 3400 | 1.130 | 7846 | 4446 | 5169 | 1.9 |
| 30-Aug | 1410 | 1.406 | 2187 | 1.340 | 2611 | 424 | 1.340 | 2611 | 1.180 | 4932 | 2321 | 2745 | 1.3 |
| 31-Aug | 1660 | 1.415 | 2519 | 1.290 | 3604 | 1086 | 1.290 | 3604 | 1.120 | 8710 | 5106 | 6191 | 2.5 |
| 1-Sep | 1860 | 1.410 | 2856 | 1.300 | 3904 | 1047 | 1.300 | 3904 | 1.070 | 16730 | 12826 | 13874 | 4.9 |
| 4-Sep | 1410 | 1.410 | 2165 | 1.280 | 3171 | 1005 | 1.280 | 3171 | 1.108 | 8220 | 5050 | 6055 | 2.8 |

With reference to these Tables, the following comments are made:

Operational Performance

The modifications made to the No 3 water treatment plant sludge clarifier to serve as a fully on line thickener handling a tailings/AMD slurry mix were sufficiently successful for purposes of the pilot trial.

The trial ran initially for a four day period (21 Aug.-24 Aug. 2012). At that point the thickener rakes became fully bogged down and the clarifier underflow chamber flooded. The trial recommenced six days later on 30 Aug. 2012 and suffered a further two day stoppage before the trial was finally discontinued on 4 Sep. 2012.

Despite the troublesome operation, the trial still generated information on several key operating parameters as described hereunder.

The trial unfortunately also revealed that the existing water plant sludge clarifiers (three units) could not effectively be converted to serve as thickeners to affect liquid/solid separation on a feed of run-of-mine tailings. As an alternative, the upstream cycloning of tailings prior to the overflow feeding the modified clarifiers is being considered.

Figure 5:
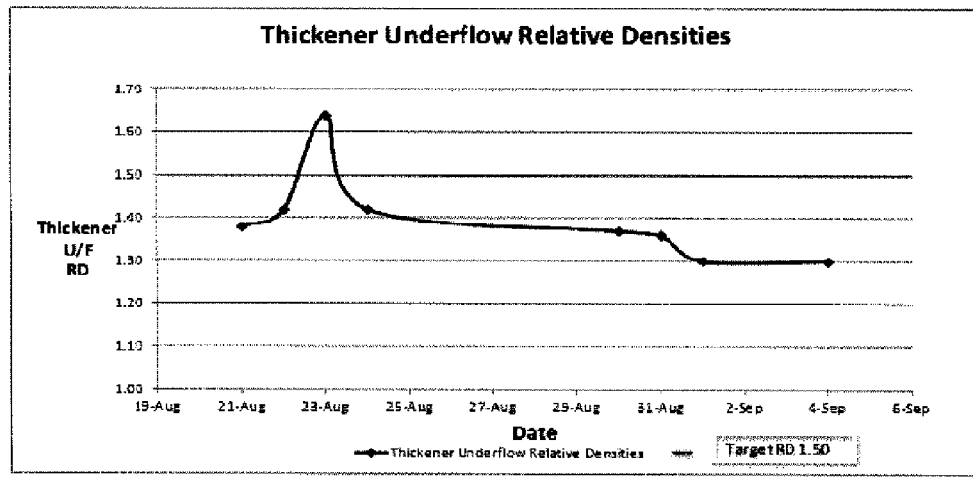
FIG. 5 is, for the Example, a graph or plot of thickener (i.e. the modified No 3 sludge clarifier) underflow densities ('RD') achieved during the trial.

For the record, FIG. 5 plots the average thickener underflow densities of the converted No 3 clarifier. Here it can be seen that the preferred higher underflow densities (which minimise the discharge of water in tailings) could not be achieved. This was purely a mechanical constraint attributed to the modified clarifier and not caused by any inherent settling difficulty within the tailings/AMD blend.

Importantly, the clarities of the thickener overflow were consistently good throughout the trial. This supports the benefit of settling neutralised AMD sludge with plant tailings.

AMD/Tailings Mixing Ratios

An important parameter required from the pilot trial was the extent of the neutralising capability of Mogale Gold 1 plant tailings and, more specifically, the quantities of neutralised AMD that can be generated from blending AMD with the plant tailings. The AMD considered in this instance was the AMD extracted from both the 17 Winze and that AMD extracted from the southern section of the West Wits Pit. Both these water sources are directly connected to the Western Basin underground mining void and both have similar characteristics including a comparatively high pH (approx pH5-pH6) arising from the ongoing deposition of plant tailings into the West Wits Pit.

No volume measuring instrumentation was available for the pilot trial. As a consequence, the data was inferred from the relative densities of slurry measured at the following points:

Density of slurry exiting the last stage of CIL 5 and prior to the addition of 17 Winze water for cyanide destruction Density of slurry exiting the plant residue section, i.e. after 17 Winze water addition but preceding South West Wits Pit water addition Density of slurry feeding the thickener (converted No 3 clarifier), i.e. after the addition of South Pit water in the mix tank.

Figure 6:
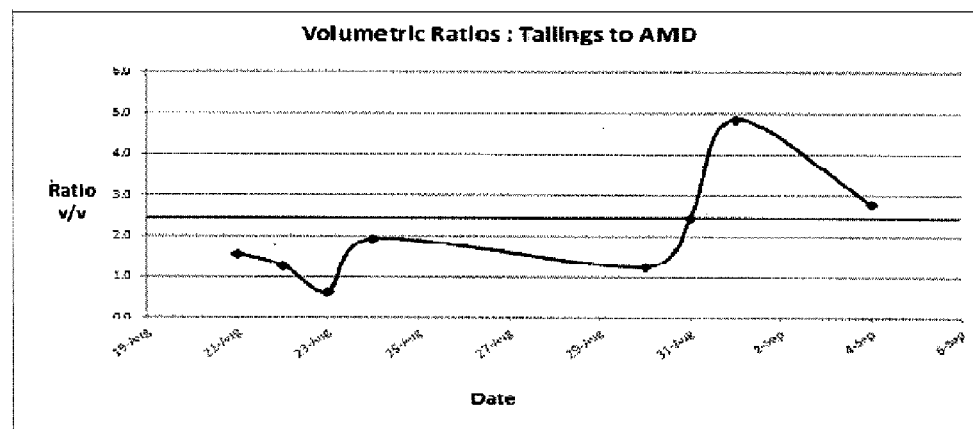
FIG. 6 is, for the Example, a graph or plot of pH levels of the volumetric ratios of Mogale Gold 1 tailings to AMD recorded during the trial.

The determined information from the trial is summarised in FIG. 6. The recorded ratio is based on the volumetric quantity of plant tailings that neutralises AMD arising from 17 Winze and the West Wits South Pit.

It was noted that the ratios developed were somewhat erratic. These relate more to the methods of estimating volumetric flows. Table 4 below summarises the average quantities of tailings and AMD recorded during the trial. This table reflects that, on average, one m³ of tailings will neutralise about 2 m³ of a combination of 17 Winze and West Wits Pit water. Should the entire Mogale Gold 1 tailings stream (estimated at 7800 m³ per day based on 5 000 t/day) be used, then an estimated 14-16 megaliters/day of the AMD would be neutralised. Over 40 megaliters/day of neutralised AMD is potentially likely to be generated when both Mogale Gold 1 and Mogale Gold 2 plants are on line. These amounts will vary though depending on the levels of acidity of AMD extracted from the void.

TABLE 4

Average quantities of 17 Winze and West Wits Pit AMD neutralised during the trial period

| | CIL No. 5 $V_{slurry}$ m³/day | AMD $V_{AMD\ Total}$ m³/day | Ratio |
|---|---|---|---|
| Date | A | B | B/A |
| 21-Aug | 5237 | 8182 | 1.6 |
| 22-Aug | 5467 | 6978 | 1.3 |
| 23-Aug | 3629 | 2264 | 0.6 |
| 24-Aug | 2677 | 5169 | 1.9 |
| 30-Aug | 2187 | 2745 | 1.3 |
| 31-Aug | 2519 | 6191 | 2.5 |
| 1-Sep | 2856 | 13874 | 4.9 |
| 4-Sep | 2165 | 6055 | 2.8 |
| Average | 3342 | 6432 | 2.1 | pH Levels

Figure 7:
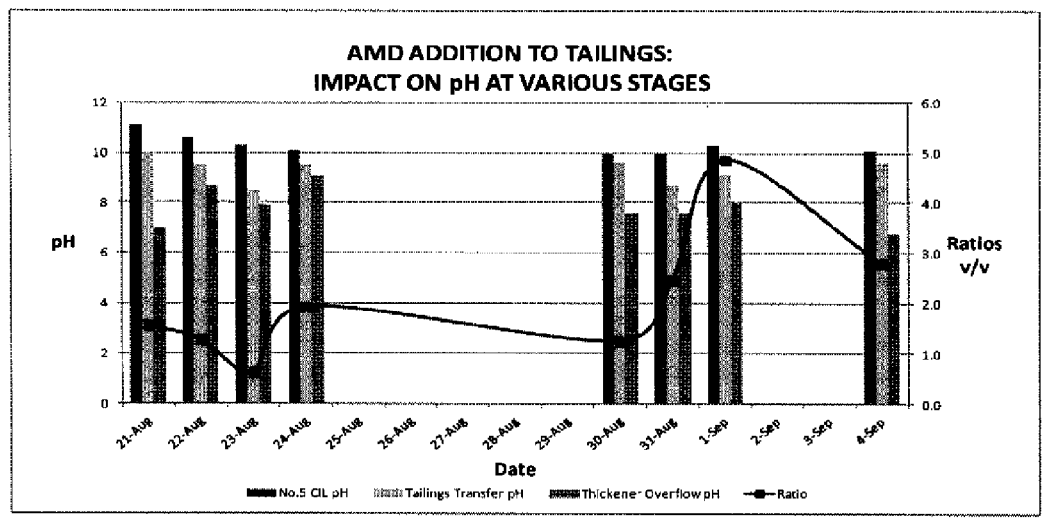
FIG. 7 is, for the Example, a graph or plot of pH levels of gold plant tailings and thickener process water after tailings/AMD blending.

The pH levels recorded during the various stages of neutralisation of AMD with Mogale Gold 1 tailings are reported in Table 2. FIG. 7 reflects the initial pH of tailings, the intermediate pH after the addition of 17 Winze AMD and then the final pH of the thickener overflow, the latter being representative of the final tailings/AMD blend. Not recorded in the graph is the initial pH of the AMD from the 17 Winze and the West Wits Pit. These values remained consistently between pH 5-pH 6.

The important parameter in this instance is the final pH of the thickener overflow. The target pH was pH 7.5-pH 8.0, that being the ideal range for process water generation and for discharge to the environment if so required. At these pH levels, heavy metal salts would have precipitated and most of the residual cyanide destroyed. Lower pH levels would result in incomplete precipitation, higher levels would result in higher residual cyanide levels and cause unnecessary scaling in process water tanks and piping.

FIG. 7 indicates that pH 7-9 was achieved. This is regarded as satisfactory for the limited controls that were present during the trial and indicative that improved control would be possible with more careful design of the circuit.

The mixing of AMD with gold plant tailings will result in a loss of acid neutralising capability of the tailings stream that finally reports to the West Wits Pit tailings disposal facility (TDF). The extent of this reduction and the potential impact from the TDF to the environment was not assessed for the plant trial. This work, known as a waste characterisation assessment, will be necessary to complete the overall assessment of the tailings/AMD process. This latter program should however be extended to include a leach test on the settled tailings such as that method undertaken by the Council of Geoscience. The presence of thoroughly mixed settled sludge within the tailings is likely to retard the transmissivity of solutions and also reduce unwanted oxidation due to the very fine gelatinous sludge occupying the voids of the tailings particles, both of which could reduce impacts to the environment from a TDF.

Free and WAD Cyanide

Cyanide is a key reagent within the gold recovery operation. All practices involving cyanide are governed by a Code of Practice. The Mogale Gold code is based on both International and South African Chamber of Mines Guidelines for Cyanide Management.

Fortunately, AMD was found to serve as a detoxifying agent for cyanide solutions and slurries, the more AMD used, the greater the cyanide decay within the solution or slurry. Prior to giving consideration to the current pilot trial, this practice was always undertaken on Mogale Gold. A target level of below 20 ppm Weak Acid Dissociate (WAD) cyanide, measured as NaCN (100%), is required within Mogale Gold tailings, that being the standard for any backfill operation. This level has always been achieved by the addition of 17 Winze AMD at the residue section and then with the subsequent discharge onto a tailings disposal facility, i.e. the West Wits Pit.

Figure 8:
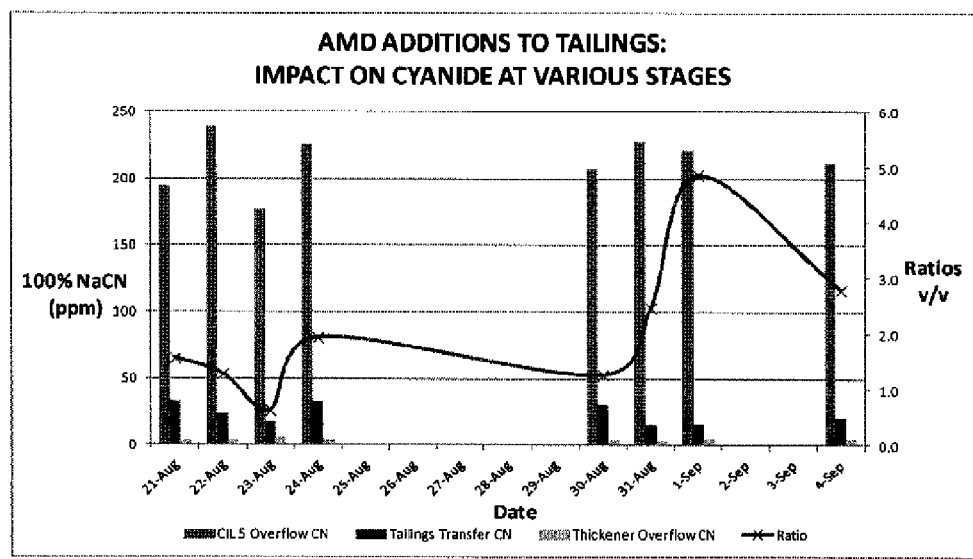
FIG. 8 is, for the Example, a graph or plot of cyanide concentrations during AMD neutralization.

FIG. 8 tracks the levels of free cyanide throughout the trial. The final measured free cyanide levels were measured at the plant to be in the region of 4-6 ppm free cyanide measured as NaCN (100%). These free cyanide levels were generally confirmed by separate samples submitted to an accredited laboratory, DD Science Laboratories cc Environmental Monitoring.

Whereas the measurement of free cyanide is determined by simple titration, the measurement of WAD cyanide represents the standard by which cyanide levels must be measured. WAD cyanide considers both free cyanide and cyanide salts that have the potential to release cyanide toxins. As a consequence, the WAD cyanide content of thickener overflow water was measured on two occasions during the trial and was determined by DD Science Laboratories cc Environmental Monitoring to be 4.3 and 4.6 ppm NaCN (100%) WAD.

Whereas 20 ppm WAD cyanide would be permitted for backfill operations, the standard for release to the environment is currently considerably less than 1 ppm WAD. This level was not achieved during the trial. Oxygenation of the slurry is expected to lower the cyanide levels appreciably. Alternatively, other cyanide destruction products such as sulphur dioxide ($SO_2$) which exists in various reagent forms, e.g. sodium meta bisulphite ($Na_2S_2O_5$), can be added, but noting that reduced quantities would be required as the majority of cyanide destruction has already been achieved by the addition of AMD.

Gold Content

Two samples of thickener overflow were analysed for gold content during the trial. The gold content was determined to be 0.011 and 0.013 gAu/t. These values are similar to the daily recorded gold content of soluble gold in the gold plant tailings stream.

Figure 9:
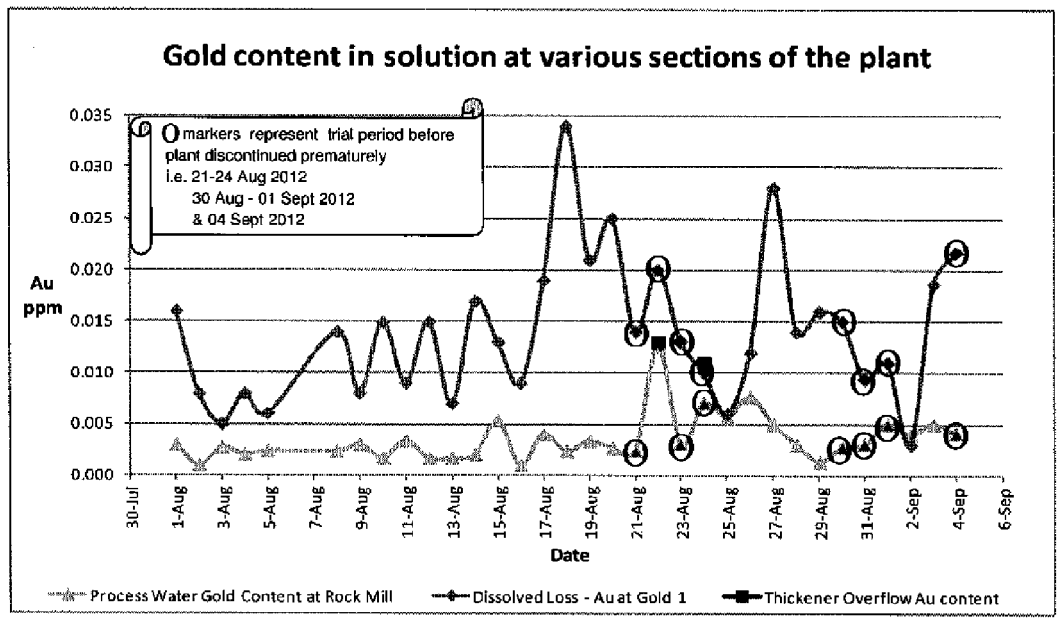
FIG. 9 is, for the Example, a graph or plot of gold monitored on the process water at sections of the plant.

However, before and during the trial, the gold content of overall Mogale Gold process water was measured after blending of the thickener water with the general process water stream. The sampling point chosen was the discharge from the Rock Mill silos which are located 6 km from the blending point. The data is presented in FIG. 9.

It is apparent that there was an increase in the quantity of dissolved gold during the trial. It cannot be conclusively stated that this was a result of the trial. However any effort to further reduce the cyanide content should assist with preventing unwanted gold dissolution outside of the CIL leach circuit.

Iron Content

The iron (total Fe) content of 17 Winze and West Wits Pit extracted AMD is currently 390 ppm total Fe. Two thickener overflow samples were taken during the pilot trial after blending tailings with AMD. The Fe contents were measured to be 1.9 ppm and 4.0 ppm thereby reflecting almost complete precipitation of the metal.

CONCLUSIONS

The following was determined from the pilot plant trial of neutralising AMD with Mogale Gold 1 plant tailings:

(i) The trial revealed that the Mogale Plant water treatment clarifiers cannot be effectively modified to serve as a thickener for the settlement of run-of-mine tailings blended with AMD. Alternative liquid/solid separation equipment/methods are required.

(ii) Despite the erratic operation of the thickener, relevant information on selected operating parameters was still achieved.

(iii) Good settlement of the mixture of mixed tailings and AMD was achieved using the existing plant flocculant. The clarities of the supernatant (thickener overflow) were good.

(iv) The trial revealed that one part volume of gold plant tailings is sufficient to neutralise two part volumes of AMD extracted either from the Western Basin Underground mining void either at the 17 Winze or West Wits Pit extraction points. This implies that Mogale Gold tailings has the potential to neutralise 14-16 megaliters per day of AMD when Mogale Gold 1 only is on line and over 40 megaliters per day of AMD when both Mogale Gold 1 and Mogale Gold 2 plants are on line. These amounts will vary depending on the levels of acidity of AMD extracted from the void.

(v) The pH of the resulting slurries, after blending tailings with AMD, varied between pH7-pH9. This is comparable to existing high density sludge AMD treatment plants using lime as a neutralising agent.

(vi) The mixing of AMD with gold plant tailings will result in a loss of neutralising capability of the tailings. The presence of thoroughly mixed settled sludge within the tailings is likely to retard the transmissivity of solutions and also reduce unwanted oxidation due to the very fine gelatinous sludge occupying the voids of the tailings particles, both of which could reduce impacts to the environment from a TDF.

(vii) WAD cyanide was reduced to approximately 4 ppm NaCN in the mixing progress. This is well within the permissible level for tailings deposition. However this level must be reduced further before discharge of solutions to the environment. Oxygenation or sulphur dioxide (e.g. using sodium metabisulphite) tests are proposed to achieve the required levels.

(viii) The dissolved gold content of Mogale Gold process water appeared to increase during the trial. This parameter should continue to be monitored during subsequent trials. The value is likely to be reduced with improved cyanide destruction.

SUMMARY

The trial revealed that effective settlement (and hence liquid/solid separation) of the mixed slurry can be achieved. Clarities of the supernatant were good.

It was determined that one part by volume of gold plant tailings can neutralise two parts by volume of current AMD extracted from the Western Basin underground mining void at the 17 Winze and West Wits Pit extraction points. This extrapolates to an AMD neutralising capability of roughly 15 megaliters per day if the Mogale Gold 1 plant operates at full capacity. The intended re-commissioning of the Mogale Gold 2 operation will provide the potential for Mogale Gold to neutralise over 40 megaliters per day of AMD from the void.

The pH of the AMD/tailings slurry mix was maintained at satisfactory levels of between pH7-pH9.

Weak Acid Dissociable (WAD) cyanide levels of the resultant solutions were reduced to below 4 ppm in the process of mixing. This level is well within Tailings Disposal Facility deposition requirements. However the cyanide level will need to be further reduced for any discharge of solutions to the environment. This is likely to be achieved by oxygen injection say to the mix tank. This aspect was not explored during the trial.

The resulting loss in the neutralising capacity of tailings following the contact with AMD must still be pursued. Specific waste characterisation testwork is recommended in this regard.

The overall trial has provided an improved level of confidence in the proposed AMD neutralisation with gold plant tailings, sufficiently to allow for the commercial aspects of the process to be more thoroughly pursued, albeit with due regard to the outstanding requirements mentioned in this report.

The Inventors have thus surprisingly discovered a method or process for treating acid mine drainage that makes use of the beneficial chemical properties of a gold recovery process tailings stream.

The invention claimed is:

1. A method for treating acid mine drainage, the method including mixing acid mine drainage and alkaline tailings from a gold recovery process, thereby to neutralize the acid mine drainage.

2. The method according to claim 1, wherein the acid mine drainage ('AMD') is in the form of an AMD stream, while the alkaline tailings are in the form of an alkaline tailings stream emanating from the gold recovery process.

3. The method according to claim 2, wherein the alkaline tailings stream has a pH of at least 9.5, and a residual dissolved oxygen concentration emanating from the gold recovery process.

4. The method according to claim 2, wherein the mixing is effected in a mixing stage, with the AMD stream and the alkaline tailings stream being fed continuously into the mixing stage, and a neutralized AMD stream being withdrawn continuously from the mixing stage.

5. The method according to claim 4, which includes agitating the mixing stage while the AMD stream and the alkaline tailings stream are fed into it and the neutralized AMD stream is withdrawn from it.

6. The method according to claim 3, which includes introducing an oxidising agent into the mixing stage.

7. The method according to claim 4, which includes introducing a neutralizing agent into the mixing stage.

8. The method according to claim 7, wherein the neutralizing agent is selected from the group consisting in sodium hydroxide, calcium carbonate or calcium hydroxide.

9. The method according to claim 4, which includes destroying a cyanide content in the neutralized AMD stream, and thereafter disposing the neutralized AMD stream.

10. The method according to claim 4, which includes subjecting the neutralized AMD stream to liquid/solid separation, in a separation stage, whereby a precipitate formed when neutralizing the AMD stream is co-separated with a solids component of the alkaline tailings stream, thereby to produce a precipitate- and tailings-containing slurry and a substantially precipitate- and solids-free stream.

11. The method according to claim 10, wherein the precipitate- and tailings-containing slurry has a solids content of at least 40 wt %.

12. The method according to claim 10, wherein the substantially precipitate- and solids-free stream has a solids content of about 50 mg/l, and a pH of at least 8.5.

13. The method according to claim 3, wherein the mixing is effected in a mixing stage, with the AMD stream and the alkaline tailings stream being fed continuously into the mixing stage, and a neutralized AMD stream being withdrawn continuously from the mixing stage.

14. The method according to claim 4, which includes introducing an oxidising agent into the mixing stage.

15. The method according to claim 5, which includes introducing a neutralizing agent into the mixing stage.

16. The method according to claim 6, which includes introducing a neutralizing agent into the mixing stage.

17. The method according to claim 5, which includes destroying a cyanide content in the neutralized AMD stream, and thereafter disposing the neutralized AMD stream.

18. The method according to claim 6, which includes destroying a cyanide content in the neutralized AMD stream, and thereafter disposing the neutralized AMD stream.

19. The method according to claim 7, which includes destroying a cyanide content in the neutralized AMD stream, and thereafter disposing the neutralized AMD stream.

20. The method according to claim 8, which includes destroying a cyanide content in the neutralized AMD stream, and thereafter disposing the neutralized AMD stream.

* * * * *